United States Patent
Gopal Gowda et al.

(10) Patent No.: US 7,577,134 B2
(45) Date of Patent: Aug. 18, 2009

(54) PORT EXPANDER FOR FIBRE CHANNEL FABRICS IN STORAGE AREA NETWORKS

(75) Inventors: Manjunath A. Gopal Gowda, San Jose, CA (US); Richard L. Hammons, Hollister, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 556 days.

(21) Appl. No.: 11/208,412

(22) Filed: Aug. 19, 2005

(65) Prior Publication Data

US 2007/0058619 A1    Mar. 15, 2007

(51) Int. Cl.
*H04L 12/50* (2006.01)
*H04Q 11/00* (2006.01)

(52) U.S. Cl. .................... 370/386; 370/16; 713/160
(58) Field of Classification Search ................ 370/386, 370/16; 713/160
See application file for complete search history.

(56) References Cited

U.S. PATENT DOCUMENTS

| | | | |
|---|---|---|---|
| 5,363,367 A * | 11/1994 | Kobayashi et al. .......... 370/474 |
| 6,401,128 B1 | 6/2002 | Stai et al. |
| 6,470,007 B1 | 10/2002 | Berman |
| 6,608,819 B1 * | 8/2003 | Mitchem et al. ............ 370/253 |
| 6,763,417 B2 | 7/2004 | Paul et al. |
| 6,985,490 B2 | 1/2006 | Czeiger et al. |
| 7,068,651 B2 | 6/2006 | Schmidt et al. |
| 7,103,704 B2 | 9/2006 | Chatterjee |
| 7,103,711 B2 | 9/2006 | Valdevit |
| 7,305,069 B1 | 12/2007 | Day |
| 7,340,167 B2 | 3/2008 | McGlaughlin |
| 2002/0023184 A1 | 2/2002 | Paul |
| 2002/0116564 A1 | 8/2002 | Paul et al. |
| 2003/0076788 A1 | 4/2003 | Grabauskas et al. |
| 2004/0013125 A1 | 1/2004 | Betker et al. |
| 2004/0024905 A1 | 2/2004 | Liao et al. |
| 2004/0081186 A1 | 4/2004 | Warren et al. |
| 2005/0025075 A1 | 2/2005 | Dutt et al. |
| 2005/0044354 A1 * | 2/2005 | Hagerman .................. 713/160 |
| 2005/0198523 A1 | 9/2005 | Shanbhag et al. |
| 2005/0232285 A1 | 10/2005 | Terrell et al. |
| 2006/0034302 A1 | 2/2006 | Peterson |
| 2006/0092932 A1 | 5/2006 | Ghosh et al. |
| 2007/0058619 A1 | 3/2007 | Gopal Gowda et al. |

(Continued)

OTHER PUBLICATIONS

"Fibre Channel Methodologies for Interconnects (FC-MI) Rev 1.8;" NCITS working draft proposed Technical Report; Sep. 28, 2001.

(Continued)

*Primary Examiner*—Dang T Ton
*Assistant Examiner*—Wei Zhao
(74) *Attorney, Agent, or Firm*—Wong, Cabello, Lutsch, Rutherford & Brucculeri, LLP

(57) ABSTRACT

An port expander Fiber Channel switch presents F_ports to form a first Fiber Channel fabric and N_ports to a second Fiber Channel fabric to appear as node devices. The port expander may be used to connect a plurality of blade servers to a Fiber Channel fabric. Fabric events engendered by the insertion or removal of hot-pluggable devices are handled by the port expander and "event storms" on the Fiber Channel fabric are avoided. The port expander presents the blade servers to the FC fabric as a virtualized N_port.

66 Claims, 12 Drawing Sheets

U.S. PATENT DOCUMENTS

2007/0091903 A1 4/2007 Atkinson
2008/0028096 A1 1/2008 Henderson et al.

OTHER PUBLICATIONS

"Fibre Channel Methodologies for Interconnects—2 (FC-MI-2) Rev. 2.60;" INCITS working draft proposed Technical Report; Jun. 7, 2005.

American National Standard for Information Technology; "Fibre Channel—Fabric Gneric Requirements (FC-FG)" Secretariat: Information Technology Industry Council; Approved Dec. 4, 1996: American National Standards Institute, Inc.

"Fibre Channel Switch Fabric (FC-SW) Rev 3.3;" NCITS working draft proposed American National Standard for Information Technology; Oct. 21, 1997.

"Fibre Channel Switch Fabric—2 (FC-SW-2) Rev 5.3;" NCITS working draft proposed American National Standard for Information Technology; Jun. 26, 2001 (pp. begin to 32 & 69-94).

"Fibre Channel Fabric—3 (FC-SW-3) Rev 6.6;" NCITS working draft proposed American National Standard for Information Technology; Dec. 16, 2003 (pp. begin to 30 & 91-116).

"Fibre Channel Physical and Signaling Interface (FC-PH) Rev 4.3;" working draft proposed American National Standard for Information Systems; Jun. 1, 1994 (pp. begin to 32).

* cited by examiner

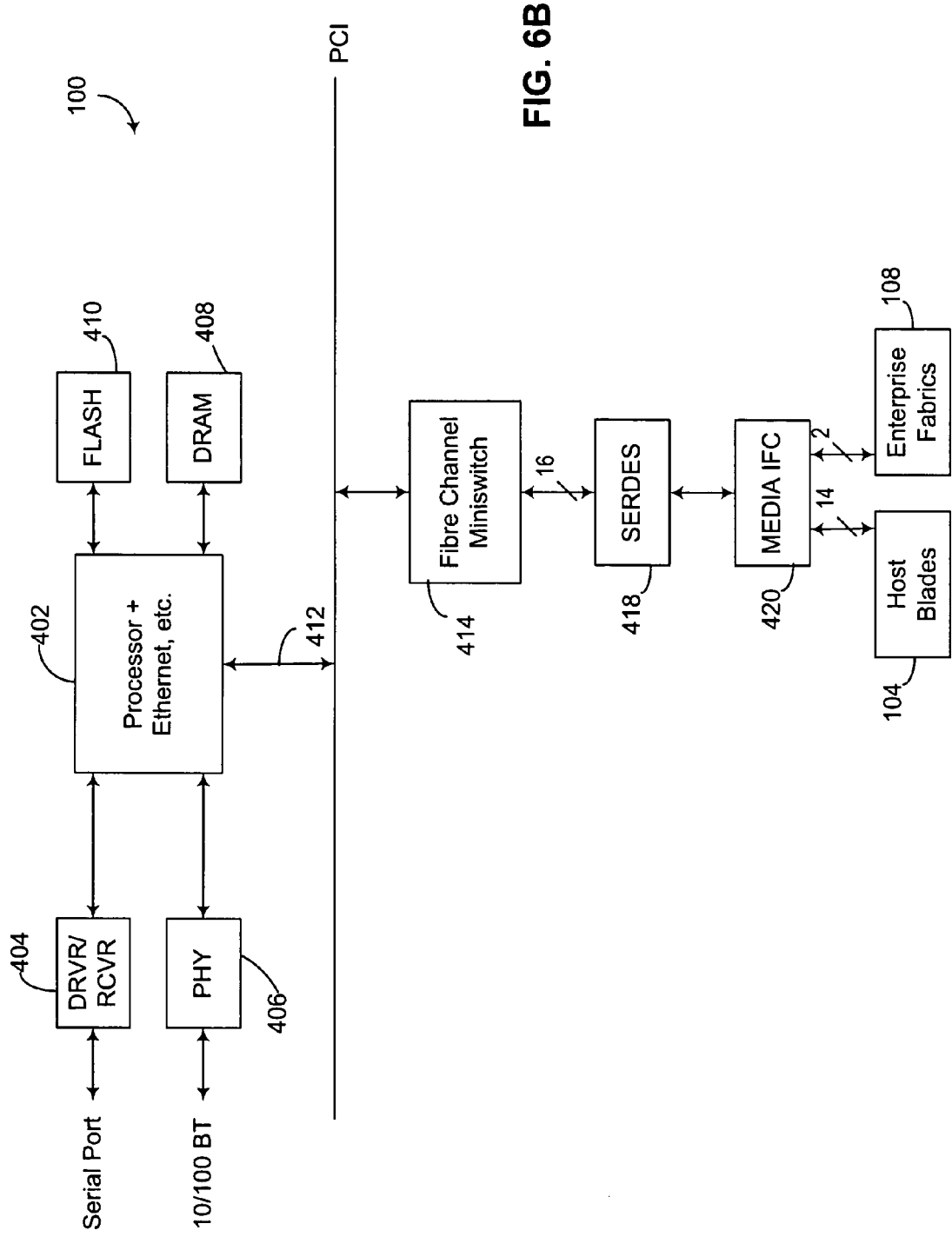

PORT EXPANDER FOR FIBRE CHANNEL FABRICS IN STORAGE AREA NETWORKS

RELATED APPLICATIONS

This application is related to U.S. Application Ser. No. 10/767,405, entitled "Isolation Switch for Fibre Channel Fabrics in Storage Area Networks," by Santosh Shambhag, Richard L. Hammons, Balakumar N. Kaushik and Vincent W. Guan, filed Jan. 29, 2004 which is hereby incorporated by reference.

BACKGROUND OF THE INVENTION

1. Field of the Invention

This invention relates to storage area networking using the Fibre Channel protocol. More particularly, it relates to storage area networks connected to blade-type file servers.

2. Description of the Related Art

The scaling of dynamic Fibre Channel fabrics is a challenging problem. When switches are added to or removed from a fabric they tend to precipitate high volumes of control traffic, causing the CPUs of the constituent switches to get overloaded, and often result in production data disruption due to fabric re-configurations. Fabrics also tend to become unstable while handling large volumes of fabric events. These issues are further exacerbated by the growing trend to blade servers. The host processor blades in the blade servers are intended to be hot-pluggable. Further, any Fibre Channel switch located on a blade would also be intended to be hot-pluggable. This makes fabrics even more dynamic and places increasingly higher scalability requirements on Fibre Channel fabrics. The hot-plug capabilities of these, possibly large, numbers of host and switch blades increases the probability of "event storms," resulting in loading or disrupting the enterprise fabrics they are connected to. These problems may ultimately result in loss of service (e.g., host bus adapter logins may timeout) under heavy load conditions in the fabric. It would be desirable to be able to use host blades and switch blades in blade servers without having the problems discussed above.

SUMMARY OF THE INVENTION

A port expander according to the present invention presents the facade of an enterprise fabric connection to the host processor blades and that of a host to the enterprise fabric and performs controlled mediation of data and control traffic between the host processor blades and the enterprise fabric. The multiplexing of multiple streams of traffic between the N_ports on the host processor blades and the enterprise fabric is accomplished by a feature in certain Fabric Operating Systems (FOS) called "N_port Virtualization" (NPV). One particular NPV mechanism is described in U.S. Patent Application Ser. No. 10/356,659 filed Jan. 31, 2003 and entitled "Method and Apparatus for Providing Virtual Ports with Attached Virtual Devices in a Storage Area Network" and in U.S. Patent Application Ser. No. 10/209,743 filed Jul. 31, 2002 and entitled "Method and Apparatus for Virtualizing Storage Devices inside a Storage Area Network Fabric." Further information is provided in U.S. patent application Ser. No. 10/201,331 filed Jul. 23, 2002 and entitled "Fibre Channel Virtual Host Bus Adapter." The disclosures of these three patent applications are incorporated herein by reference. An additional alternative is described in U.S. Patent Application Ser. No. 10/767,405, incorporated above. Using the NPV mechanism, the number of host processor blades that can simultaneously be plugged in, and to which virtual N_port identifiers can be assigned, is 255 (using a one-byte port id), which is a sufficiently large number to accommodate the number of blades in present day blade server chassis.

A port expander according to the present invention can be connected to multiple enterprise fabrics, with the N_port identifiers within the enterprise fabrics mapped to addresses that are scoped by the port expander. All control traffic address mappings between virtual and physical addresses may be mediated by the CPU of the port expander and routing is performed at wire speed.

The use of N_port virtualization enables the port expander to act as an initiator, which is advantageous as this allows partitioning of fabrics and isolation of the enterprise fabric from exchanges originating from the host processor blades. Since the host processor blades are not directly connected to the enterprise fabric, the enterprise fabric is isolated from large amounts of fabric activity due to host processor blades being swapped in and out. Further, since the host processor blades are not connected to the enterprise fabric through a conventional switch located in the blade chassis, loss of power to a blade chassis does not cause fabric reconfiguration. This isolation promotes scalability within the enterprise fabric. Since the port expander may preferably be a single conduit into the enterprise fabric, it is also a good point to enforce perimeter defenses (similar to a firewall) against attacks, either intentional or resulting from misbehaviors. The port expander may also act as a throttle by controlling the host processor blade access into the enterprise fabric. Further, the port expander may act as a protocol gateway. In addition, the use of the N_port connection to the enterprise fabric increases interoperability, as compared to using an E_port connection.

BRIEF DESCRIPTION OF THE DRAWINGS

FIG. 6B is a block diagram of exemplary port expander according to the present invention.

DETAILED DESCRIPTION

Figure 1:
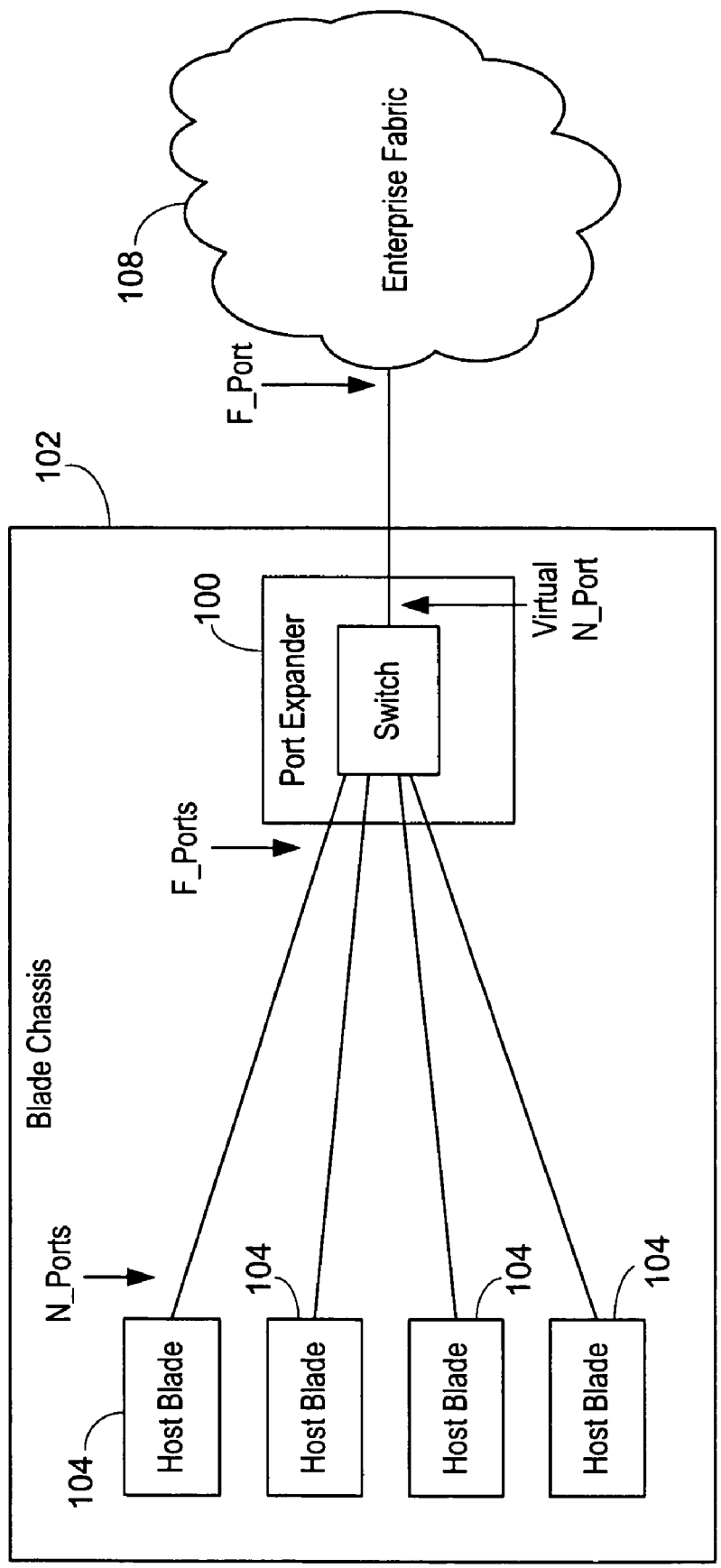
FIG. 1 is a schematic representation of an port expander in logical communication with four host blades and an enterprise fabric according to the present invention.

Many organizations have begun consolidating their file servers into centralized data centers, looking to use physical, application or data consolidation as a means of reducing the challenges and costs associated with administering many small file servers scattered across the enterprise. To date, physical consolidation has generally involved replacing bulky tower servers with slender 1U or 2U rack systems. Such rack systems take less space and put the servers and infrastructure within easy reach of the network administrator, rather than spread across a large area.

These servers enable organizations to reap many benefits of consolidation, yet because each server requires its own infrastructure—including, e.g., cables for power, Ethernet, systems management, power distribution units (PDUs), keyboard/video/mouse (KVM) switches and Fibre Channel switches—they present challenges of their own. A rack of 1U servers can have hundreds of cables strung throughout the rack, making it difficult to determine which cables attach where and complicating the addition and removal of servers to and from the rack. In addition, the PDUs and switches consume valuable rack sidewall space. A blade server eliminates many of these complications, thus providing an effective alternative to 1U and 2U servers.

The term "blade server" refers to a rack-optimized server that can hold a number of hot-swappable devices called blades. There is a range of blade server designs—from ultradense, low-voltage, lesser-performing servers to high-performance, lower density servers to proprietary, customized rack solutions that include some blade features.

A port expander according to the present invention may be a Fibre Channel (FC) switch in the blade form factor that is housed in a chassis that may include Ethernet switch modules, Fibre Channel switch modules, KVM management modules, power supply modules, a midplane and host blades (all not shown). An example of such a device is the IBM eServer BladeCenter. In addition to providing FC switching capabilities, the port expander may also incorporate advanced capabilities for providing failure and security isolation, and can facilitate enterprise fabric scaling. Another benefit of the port expander is that it can be interoperable with a variety of switches since it connects to the enterprise fabric as an N_port rather than as an E_port in the preferred embodiment.

This disclosure describes the architecture of an port expander according to the present invention. The role of a port expander is to enable Fibre Channel fabrics to behave well when blade servers are connected to them. Fibre Channel fabrics comprise one or more Fibre Channel switches connected in some networked topology.

Blade servers introduce a level of service distribution (distribution of applications across blades to scale out) that is not as common in current 'monolithic' servers, which are typically configured to run an enterprise application running on a single server. Furthermore, misbehaving host bus adapters (HBAs) might induce control traffic, e.g. repeatedly doing FLOGIs (fabric logins, a process by which a node makes a logical connection to a fabric switch) and, with the introduction of a large number of blades, the probability of such misbehavior increases. As a result, there is a greater likelihood of a larger number of data and control traffic exchanges being initiated from multiple sources and it is critical to insulate the fabric from misbehaviors and/or malicious attacks.

A port expander is similar to a conventional switch blade in that it presents standard F_ports (fabric ports to which N_ports attach) to the host blades, but different in that it connects to the enterprise fabric as N_ports (rather than as E_ports) in the preferred embodiment. The port expander is essentially transparent to the fabric. FIG. 1 shows a possible deployment of the port expander in a blade chassis 102 with a series of host blades 104. The port expander 100 replicates some of the functionality of a Fibre Channel fabric bridge. However the port expander 100 is quite different from, and consequently simpler than, a fabric bridge.

Figure 2:
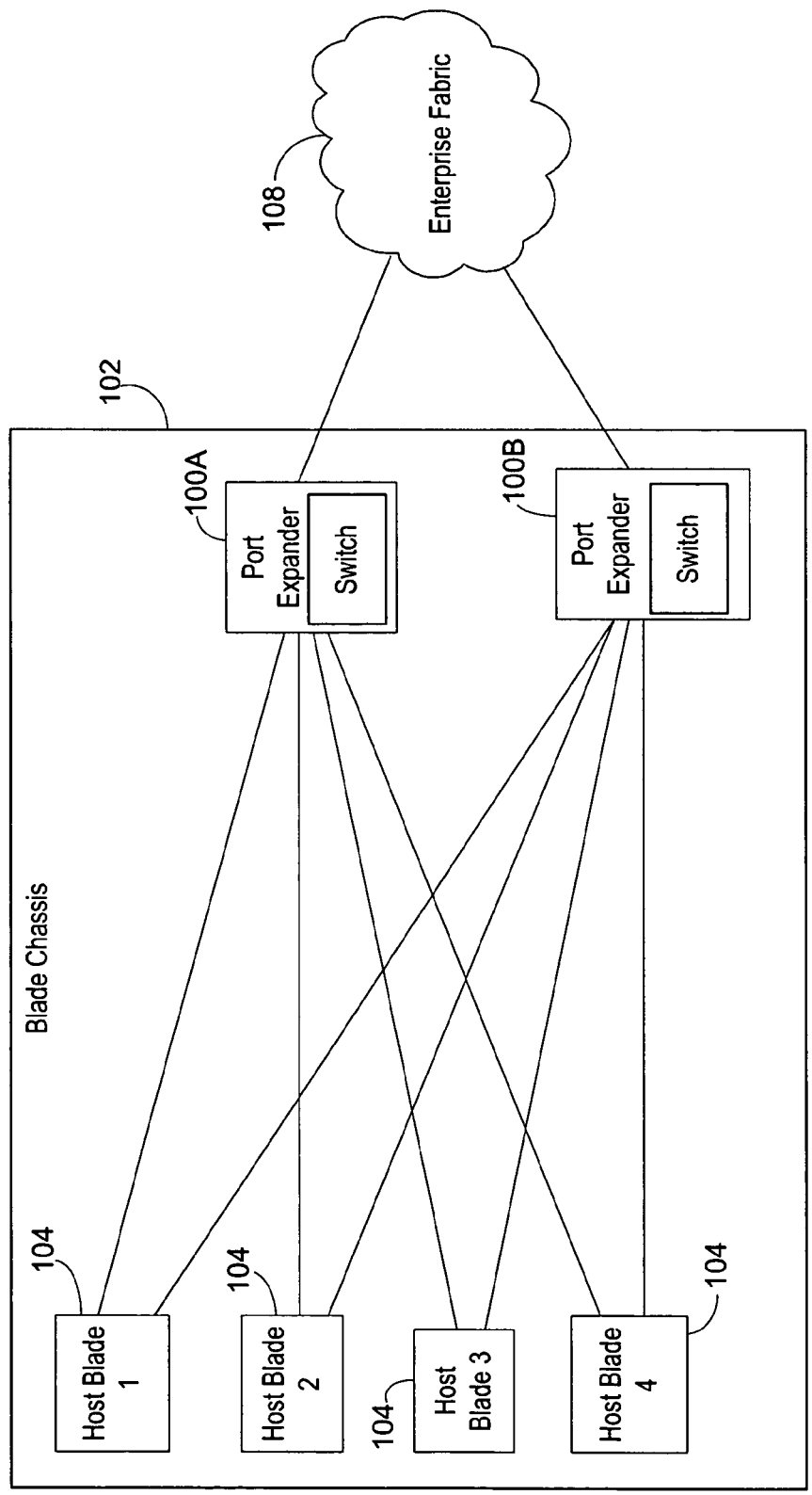
FIG. 2 is a schematic representation of a system in which four host blades are connected to a pair of port expanders according to the present invention.

As illustrated in FIG. 2, one may dual-connect each host blade 104 to multiple port expanders 100A, 100B in order to eliminate a single point of failure. This dual-connect is conventional in existing SANs and the port expander allows such a configuration to be maintained.

Fabric scalability is about ensuring that the Fabric OS can reasonably handle the peak load conditions induced by ever-larger fabrics during periods of intense demand and activity. Such peak loads generally involve fabric-wide events that affect many of the Fabric OS components. Fabric reconfiguration takes place with the introduction and removal of switches into the fabric. The reconfiguration process involves computation-intensive activities such as rebuilding of fabrics, re-computation of routes, etc. With the introduction of bladed servers and switches, fabrics are expected to become increasingly more dynamic, resulting in an increase in the rate at which these fabric-wide events and fabric reconfigurations occur. Hence, the scalability issues may be further exacerbated.

When an embedded switch in a blade server chassis joins the fabric, the introduction of the embedded switch typically requires a domain id assignment, routes to be recomputed, zone merges to be done and so on. Since the key capability provided by blade servers is the ability to scale out and provide modularity, the plugging in and out of blades may be a norm rather than an exception and these fabric reconfigurations are more likely to take place more frequently.

When a number of blade servers attempt to FLOGI to an embedded switch's F_ports, a large number of updates to the switch's login database may be triggered. A Fibre Channel Protocol (FCP) daemon in the Fabric OS may start probing the N_ports and send "update area" messages to the name server. A large number of probes and name server updates may be triggered, followed by the name server sending Registered State Change Notifications (RSCNs), a switch function that allows notification to registered nodes if a change occurs in the fabric. Similarly, a blade being removed from the chassis may trigger updates to the switch login database and name server database and may cause more RSCNs to be sent out to registered devices. A large amount of such internal fabric activity results in a large amount of processing burden on switch CPUs and this may result in device-initiated exchanges timing out, resulting in devices not being able to receive proper service.

Aspects of the present invention involve isolating blade servers from the enterprise fabric via the port expander 100. This provides a high level of isolation between the host blades 104 and the enterprise fabric 108. Scalability is enhanced due to isolation provided by the port expanders 100 to enterprise fabrics 108 such that the enterprise fabric 108 is not directly impacted when host blades 104 are swapped in and out or the blade chassis is powered up or down and can hence provide a more controlled environment to the enterprise fabric 108.

Connecting as an N_port using the NPV mechanism enables the port expander 100 to be connected to non-proprietary enterprise fabrics 108 and does not have the potential interoperability issues of proprietary E_port implementations.

Figure 3:
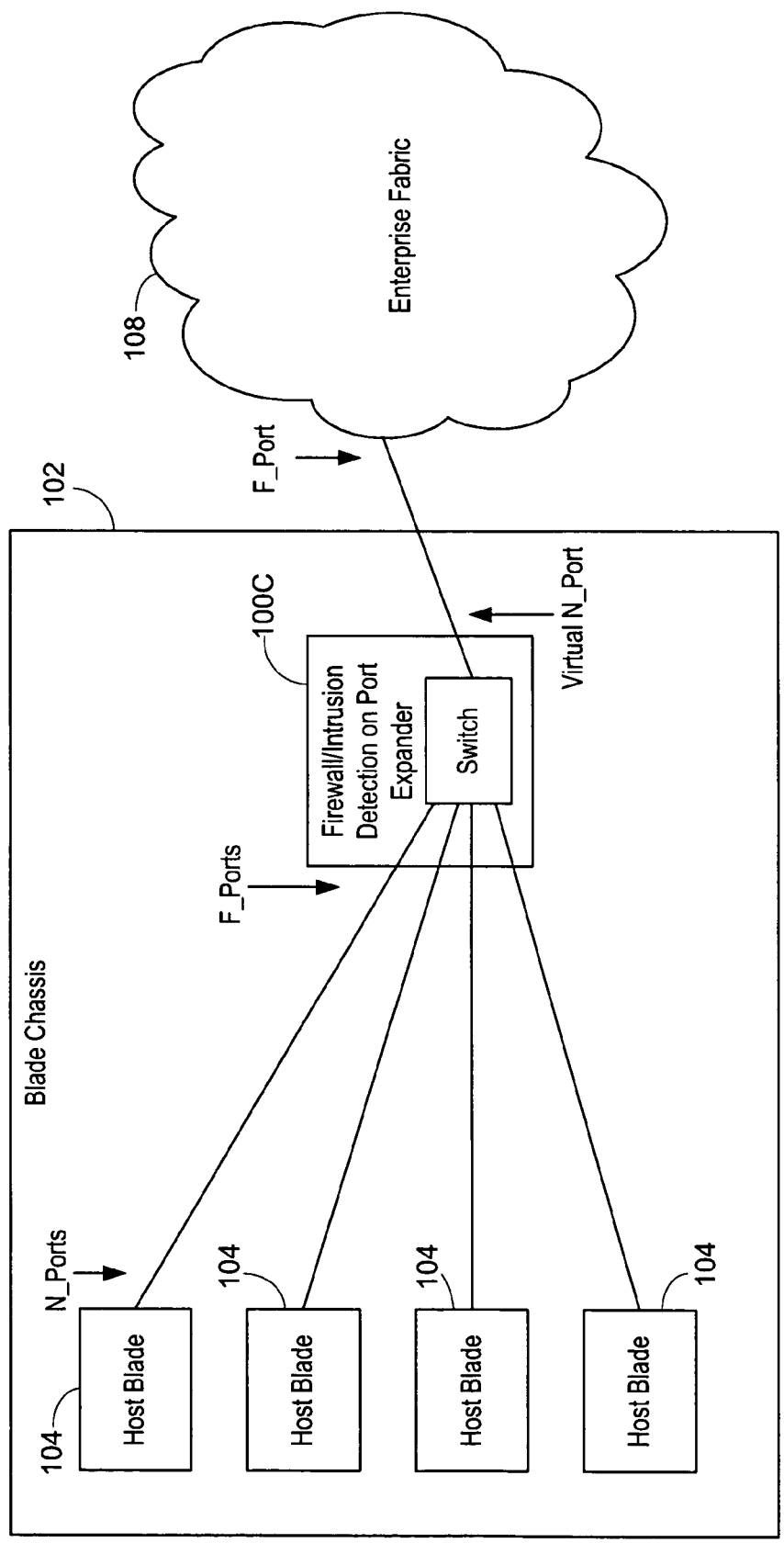
FIG. 3 is a schematic representation of a Fibre Channel enterprise fabric in logical communication with a firewall/intrusion detector in an port expander according to the present invention.

Since the port expander 100 places itself in the control path of any traffic that originates on the host blades 104 and may be intended for the enterprise fabric 108, the port expander 100 is a viable base for hosting software that can perform port and Logical Unit Number (LUN) filtering, zoning enforcement, stateful inspection, checking for malformed packets, probing for buffer overflows in the FOS copies in the blade center fabric, and performing overall in-band intrusion detection. In other words, the port expander 100 can fulfill a secondary purpose of providing enhanced security at the perimeter of the enterprise fabric 108 by acting in the role of a "firewall" by selectively filtering out frames that match certain criteria of deviant behavior. FIG. 3 shows one such implementation in schematic form wherein a firewall/intrusion detection system is hosted on port expander 100C.

With this location, the port expander 100 may also act as a protocol gateway, such as iSCSI to FCP and so on.

Figure 4:
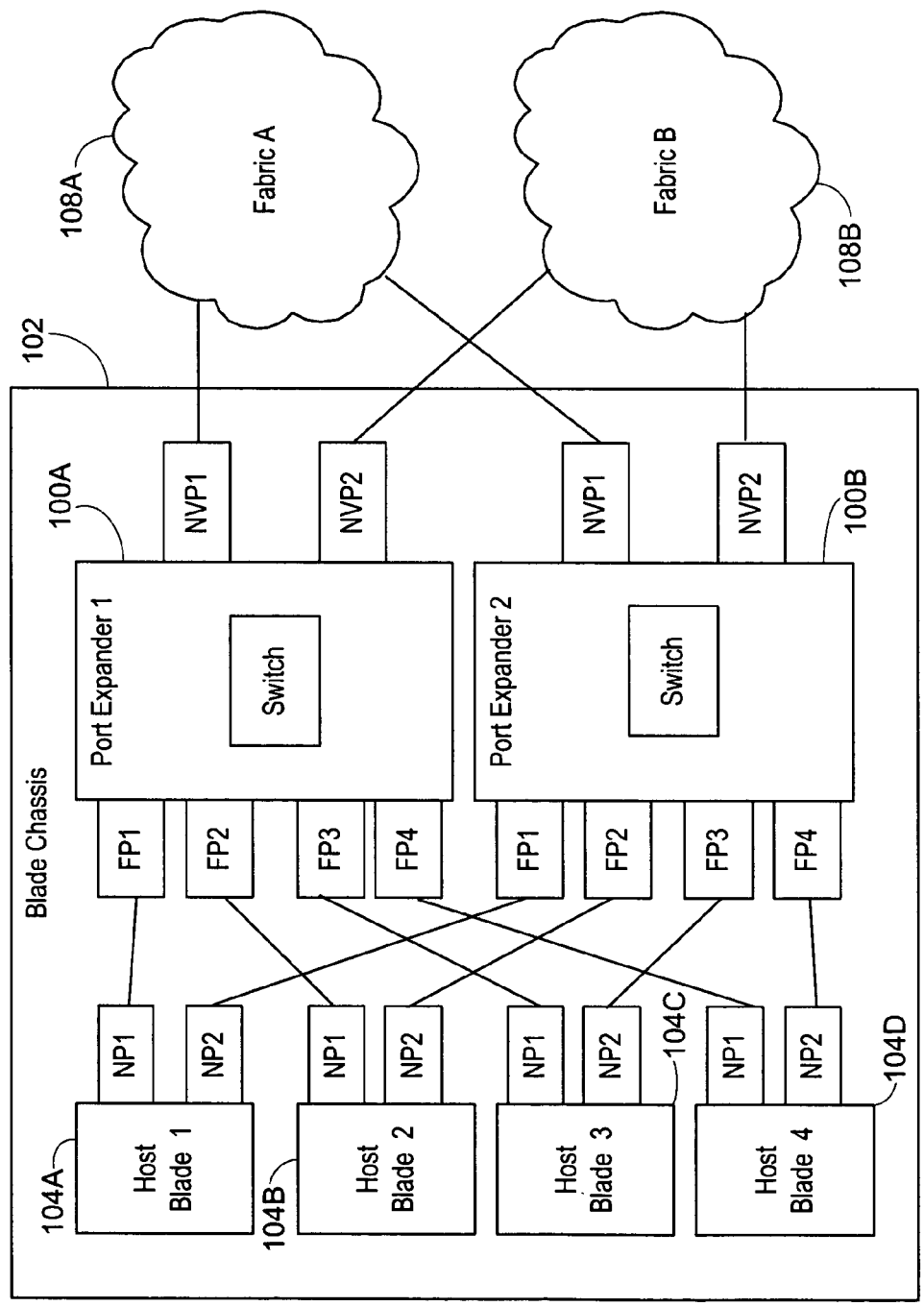
FIG. 4 is a schematic representation of a dual connected host-target configuration according to the present invention.

FIG. 4 depicts a typical deployment architecture with a pair of port expanders (port expander 1 100A and port expander 2 100B) providing dual connectivity for four host blades (host blade 1 to host blade 4 104A to 104D) to two fabrics (A 108A and B 108B). This configuration can be similarly extended to any number of host blades, port expanders or enterprise fabrics. For a 16 port port expander connected to two fabrics with dual connectivity, up to 14 host blades may be connected to the port expander.

Figure 5:
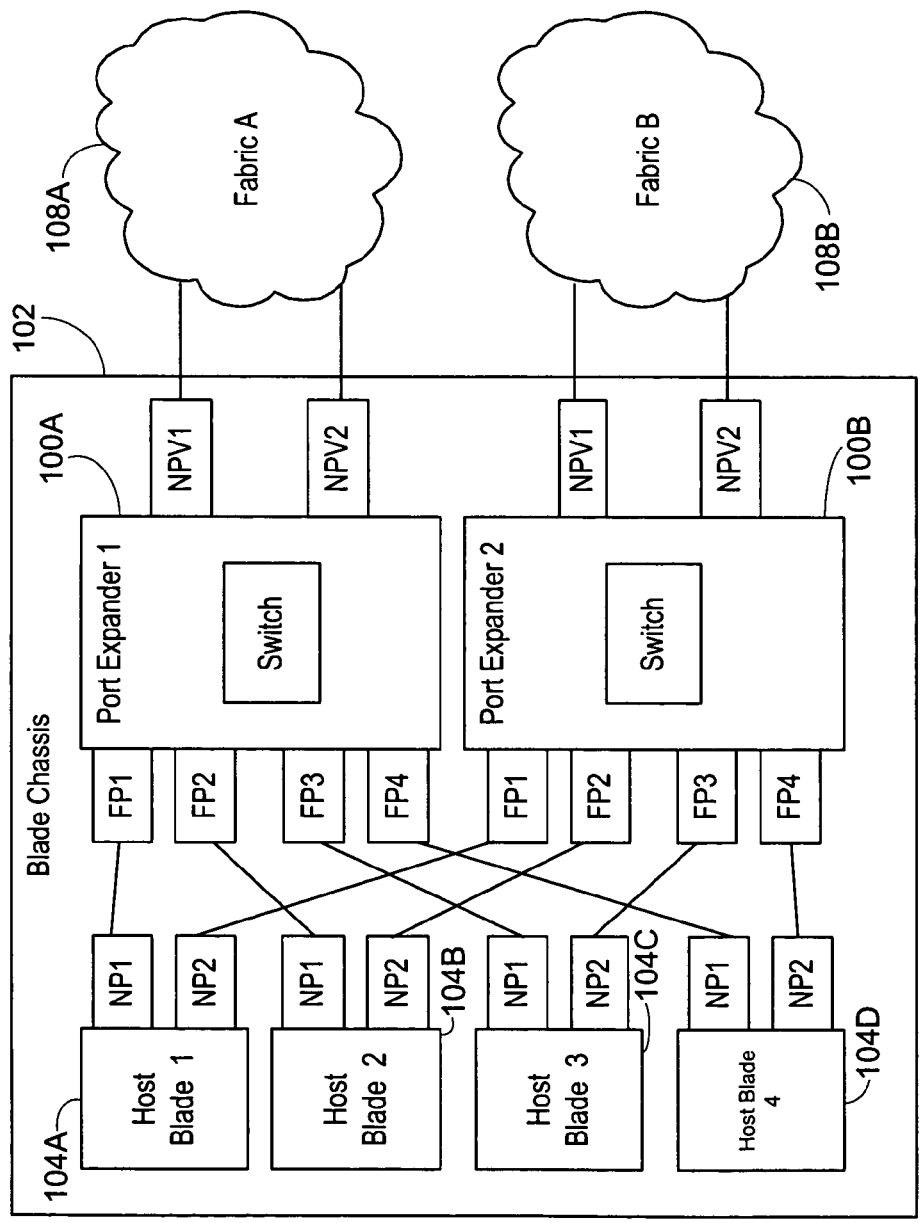
FIG. 5 is a schematic representation of an port expander with path fail over according to the present invention.

The port expander 100 may be designed to provide path fail-over capability. FIG. 5 shows a port expander configuration with path fail over. If one path to a fabric 108A or 108B is lost due to a link going down between the port expander 100A or 100B and the fabric 108A, 108B, the port expander 100A, 100B may connect the host blades to the other port and then reconnect the host-blades to the enterprise fabric. The configuration of FIG. 5 may also be used to improve performance between the fabrics A and B 108A, 108B and the port expander 1 and 2, 100A, 100B by trunking the N_ports, if the switch in the fabric supports trunking. Trunking is described in more detail in U.S. Patent Application Ser. No. 09/872,412, entitled "Link Trunking and Measuring Link Latency in Fibre Channel Fabric," filed Jun. 1, 2001, which is hereby incorporated by reference.

A simplified architecture makes certain assumptions regarding the behavior of host blade host bus adapters. The assumptions are: a) the host blades 104 can handle or respond to RSCNs when notified about changes to devices connected to the enterprise fabric 108; and, b) in the case where servers are connected to the same enterprise fabric 108 across multiple port expanders 100, it is assumed that the servers have the ability to handle multi-pathing for load balancing or fail over appropriately. In a more complex architecture the port expander 100 can handle these functions if needed.

Figure 6A:
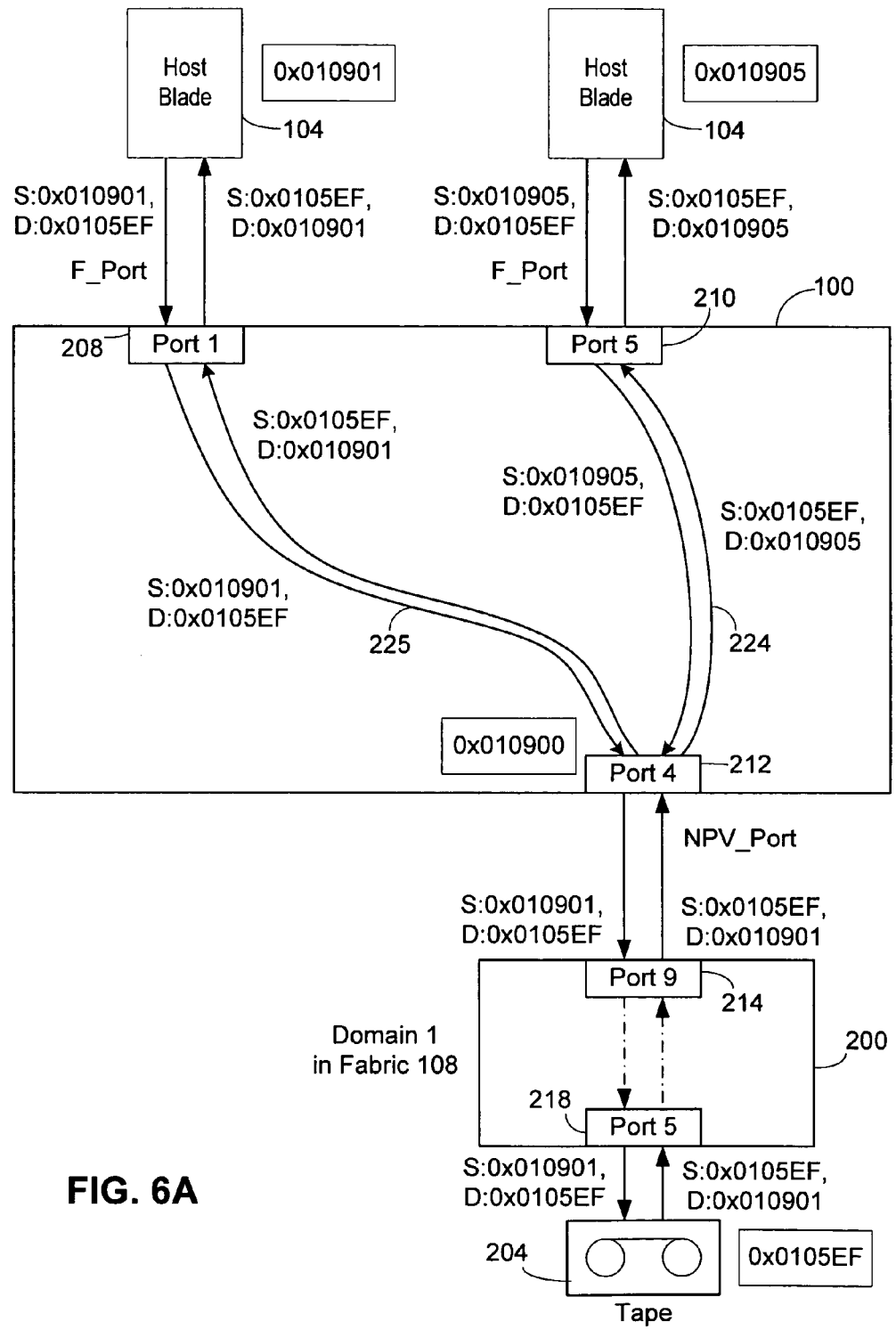
FIG. 6A is a representation of frame flow from a host blade to a target in the enterprise fabric according to the present invention.

A detailed example of the transfer of frames using an port expander is shown in FIG. 6A. The port expander 100 is connected to a switch 200, which is representative of the enterprise fabric 108, and to a host blade 104. In the illustrated example, port 1 208 of the port expander 100 is connected to the host blade 104. The port 1 208 is configured in F_port mode. Additionally, port 5 210 is configured as an F_port and is connected to a host blade 104. Similarly, port 4 212 of the port expander 100 is connected to a port 9 214 of switch 200, a switch in the enterprise fabric 108. The port 4 212 is configured in NPV_port mode, while the port 9 214 is configured in F_port mode. A tape drive unit 204 is connected to port 5 218 of switch 200. It is presumed that the switch 200 is domain 1 in fabric 108.

Port 4 212 is connected by a intraswitch link 224 to port 5 210. Port 4 210 is connected to port 1 208 by a intraswitch link 225. Being connected to port 9 214 of the switch 200, port 4 212 of the port expander 100 receives PID of 0x010900. In one embodiment port 1 208 thus has a PID of 0x010901 and Port 5 210 has a PID of 0x010905, effectively being treated as loop devices connected to port 4 212 for addressing reasons, with the port number forming the AL_PA. In an alternate embodiment the AL_PA address portion is assigned by the fabric 108, as it is understood that this is an N_port virtualization situation. Routing from port 1 208 and port 5 210 is normal, being based on domain and then area, with all domain 01, area 09 values being routed to port 4 212. Routing from port 4 212 is based on the domain and then AL_PA, not the area, in the address. This is done because all of the ports presenting themselves to the switch 200 through port 4 212 have the same domain and area, even though they are on the same actual device where normally the areas would be different. By using AL_PA routing in one direction and properly assigning the AL_PA values and using area routing in the other direction, address translations are not required.

FIG. 6B illustrates a block diagram of an port expander 100 according to the preferred embodiment. In port expander 100 a processor unit 402 that includes a high performance CPU, preferably a PowerPC, and various other peripheral devices, including an Ethernet module, are present. Receiver/driver circuitry 440 for a serial port is connected to the processor unit 402, as is a PHY 406 used for an Ethernet connection. A flash memory 410 is connected to the processor 402 to provide permanent memory for the operating system and other routines of the interfabric switch 120, with DRAM 408 also connected to the processor 402 to provide the main memory utilized in the port expander 100. A PCI bus 412 is provided by the processor 402 and to it is connected a Fabric Channel miniswitch 414. The Fibre Channel miniswitch 414 is preferably developed as shown in U.S. patent application Ser. No. 10/123,996, entitled "Fibre Channel Zoning By Device Name In Hardware," by Ding-Long Wu, David C. Banks, and Jieming Zhu, filed on Apr. 17, 2002 or Ser. No. 10/767,213, entitled "Fibre Channel Zoning Hardware For Directing A Data Packet To An External Processing Device," by Timothy Millet, Surya Varanasi, Indraneel Ghosh and Zahid Hussain, filed Jan. 29, 2004, which are hereby incorporated by reference. The miniswitch 414 is thus effectively a 16 or 32 port switch. In the 16 port case, all sixteen ports of the miniswitch 414 are connected to a series of serializers 418, which are then connected to media unit 420. Fourteen of the media units 420 are for connection to host blades 104 and two media units 420 are for connections to enterprise fabric or fabrics 108.

Figure 7:
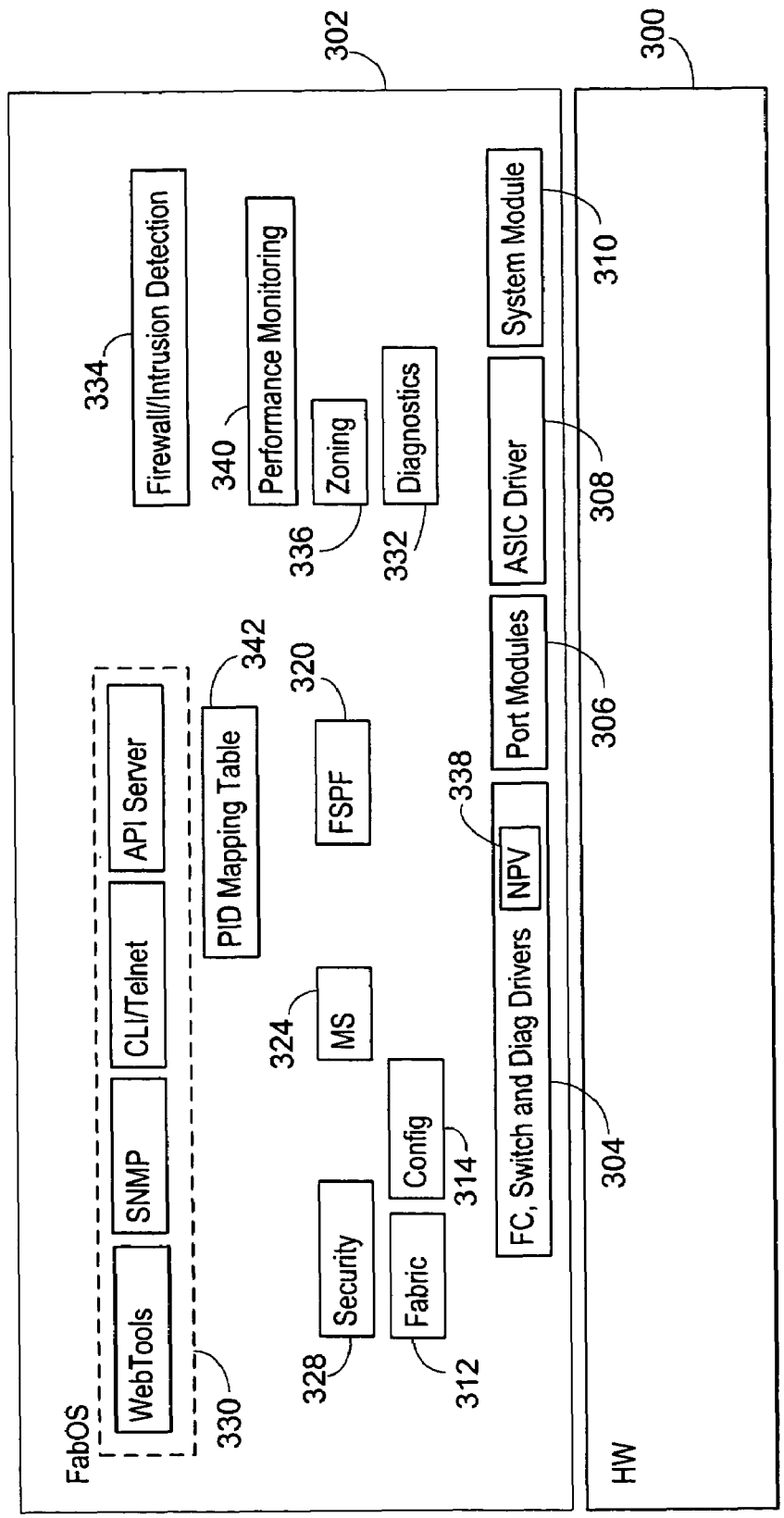
FIG. 7 is an illustration of the software modules in a port expander according to the present invention.

Proceeding then to FIG. 7, a general block diagram of the port expander 100 hardware and software is shown. Block 300 indicates the hardware as previously described. Block 302 is the basic software architecture of the virtualizing switch. Generally think of this as the port expander fabric operating system and all of the particular modules or drivers that are operating within that embodiment. Modules operating on the operating system 302 are Fibre Channel, switch and diagnostic drivers 304; port modules 306, if appropriate; a driver 308 to work with the Fibre Channel miniswitch ASIC; and a system module 310. Other switch modules include a fabric module 312, a configuration module 314, an FSPF or Fibre Shortest Path First routing module 320, an MS or management server module 324 and a security module 328. Conventional name server and alias server functions are not required as all requests to those servers are simply passed through to the fabric, except that FLOGIs are converted to FDISCs according to the N_port virtualization protocol. Additionally, the normal switch management interface 330 is shown including web server, SNMP, telnet and API modules.

Two additional modules are present according to the present invention. A firewall/intrusion detection module 334 performs those features as described. Finally, a virtual node port module 338 performs the node port virtualization function. This module 338 is included in the drivers 304 in the preferred embodiment.

The link initialization protocol between a host blade 104 and the port expander 100 and between the port expander 100 and enterprise fabrics 108 is the same as that of a normal F_port as described in the FC-PH and FC-FS standards. Once link initialization is complete, the N_port or virtual N_port and F_port are in the active state. The link initialization between the host blade 104 and port expander 100 and between the port expander 100 and the F_ports of the enterprise fabrics 108 can happen independently of each other.

The connection of the port expander 100 to the enterprise fabric 108 causes an FLOGI into the enterprise fabric 108. The introduction of the first host blade 104 into the blade chassis 102 causes an FLOGI into the port expander 100. This results in the port expander 100 performing FDISC requests into the enterprise fabric 108 for each host blade 104 that is in the blade chassis 102 to get virtual port ID (PID) assignments for the host blades 104. This process is described more completely in U.S. patent application Ser. No. 10/291,331 incorporated by reference above. This virtual port ID received after the FDISC is then provided to the host blade 104 in response to its FLOGI.

The name server of the enterprise fabric 108 will thus be populated with the virtual N_port IDs representative of the host blade 104 N_ports. Since the enterprise fabric 108 may not be ready to respond to the FLOGI from the port expander 100, the port expander 100 must retry the FLOGI some number of times until successful or disable the port.

Figure 8:
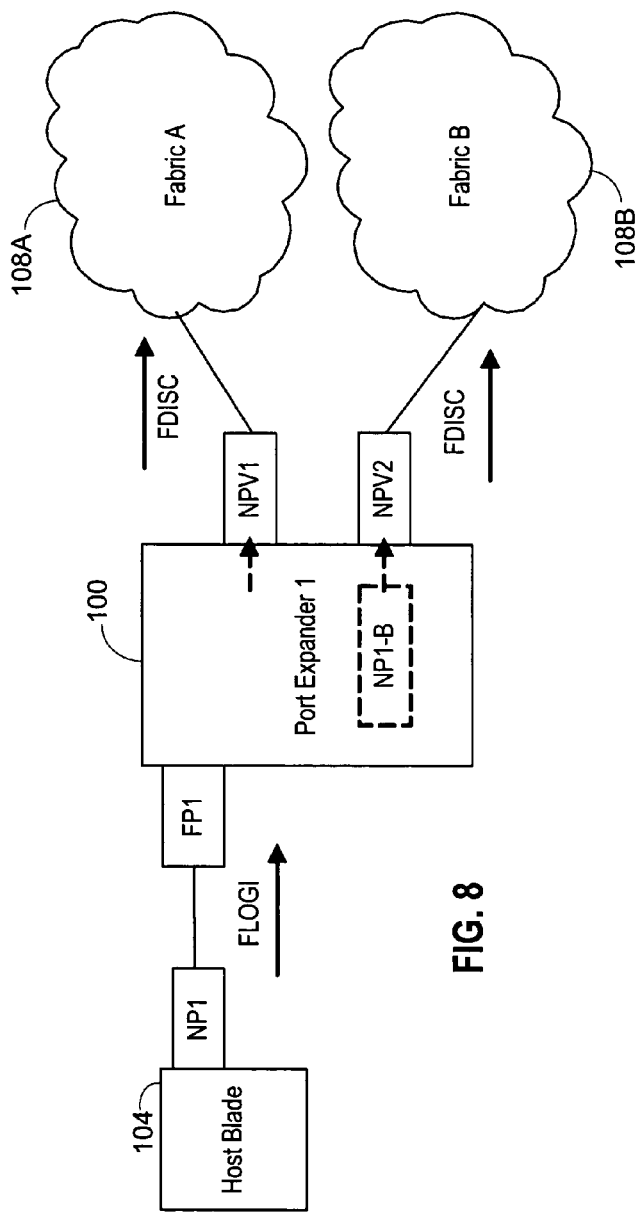
FIG. 8 depicts a fabric initialization and login procedure according to the present invention.

During the initial switch and fabric bring-up phases, a large number of activities occur simultaneously. The port expander 100 decouples the fabric bring up of the enterprise fabric 108 from the blade center fabric 106 and, as a result, the blade center fabrics 106 and enterprise 108 fabrics may be brought up in any order and independently of each other. The two bring up scenarios are described below 1. Bringing Up the Enterprise Fabrics Before the Port Expander:

Referring now to FIG. 8, consider enterprise fabrics A and B 108A and 108B being brought up first such that these fabrics are built, zoning starts doing zone merges, and edge devices connected to these fabrics try to do FLOGI and then query the name server (NS). When a port expander 100 is connected to fabrics A and B 108A and 108B, it can now FLOGI into these fabrics. However, if the switches in fabrics A and B 108A and 108B have not completed fabric initialization at the time the port expander 100 is connected to them (i.e. not yet obtained their domain IDs), they may disable the port on which they receive the FLOGI. Once the domain id has been assigned, they may re-enable the port. As a result, the enterprise fabrics 108 have an opportunity to quiesce before they respond to the port expander 100 FLOGIs, since the port expander 100 is attempting to connect as a device and not as a switch. Eventually, the switch in the enterprise fabric 108 may send an LS_ACC responding to the FLOGI with an N_port id for the port expander 100 port that performed the FLOGI. The port expander 100 may forward the name server query from the host blade 104 to the enterprise fabric 108 and return the responses back to the host blade 104.

Subsequently, when a host blade 104, is plugged into the blade chassis 102 and an FLOGI is performed from N_port 1 (NP1) the port expander 100 may then send an FDISC to the enterprise fabric 108 for host blade 104 and may receive a virtual N_port id for N_port 1. In an alternate embodiment, the virtual N_port ids can be assigned a priori (i.e. before the host blade 104 is plugged in) to a given slot id so that a virtual PID is assigned before the host blade 104 is plugged into the slot. However, this approach may result in unnecessary NS entries being created in the enterprise fabric 108 if the host blades 104 do not exist. Also, Port Logins (PLOGI's) to these virtual N_ports may have to be rejected in cases where the host blade 104 does not exist or the port expander 100 may have to handle these exchanges.

The host blade 104 N_port 1 may then register with the fabric name server and can do a PLOGI into devices and continue with other operations as usual.

2. Bringing Up the Port Expander Before the Enterprise Fabrics:

When the host blade 104 is plugged into the blade server before fabrics A and B 108A and 108B are brought up, N_port 1 may FLOGI into F_port 1 (FP1) of the port expander 100. However, the name servers in the enterprise fabrics 108A and 108B may not yet be available to perform FC operations to targets within the enterprise fabrics 108A and 108B. Subsequently, Fabrics A and B 108A and 108B may be brought up and the port expander 100 may perform FLOGI and FDISC to get a virtual address assignment for N_port 1, after which N_port 1 can PLOGI into devices and perform other operations as usual. Other host blades like host blade 104 can FLOGI while Fabrics A and B 108A and 108B are coming up. The port expander 100 then performs FDISC operations for each of these additional host blades.

After receiving a LS_ACC for its FLOGI request after the port expander 100 completes the FDISC operation, each host blade 104 can register for RSCN, and perform a N_port login with the name server of the enterprise fabric 108. The host blades 104 may also want to query the name server database and perform N_port login with target devices in the enterprise fabric 108. This can be done as the host blades 104 have unique fabric addresses.

If the host blades 104 attempt to login and register and the port expander 100 has not yet completed the link initialization, login and FDISC to the enterprise fabrics 108, the host blades 104 will be delayed until the port expander 100 has completed these operations. The host blade 104 may be able to subsequently PLOGI only when the targets become visible. This enables the enterprise fabric 108 build to be completed (all domains are reachable) and routes to be established before the host blades 104 start querying about or attempt to PLOGI into the devices connected to the enterprise fabric 108.

On the other hand, if the port expander 100 has already completed FLOGI and FDISC with the enterprise fabric 108 and enterprise fabric 108 devices have been registered with the NS, the host blades 104 can discover devices by querying the enterprise fabrics 108 NS for the targets. This isolation between the target devices within the enterprise fabrics 108 and host blades 104 enables the enterprise fabrics 108 to be insulated from a large amount of simultaneous activity.

The addition of an additional host blade 104 into the blade chassis 102 may trigger a new FDISC to the enterprise fabric 108 and the assignment of a virtual N_port id and not a FLOGI. Since FDISC does not trigger FCP probing and NS updates, this process may be less disruptive to the enterprise fabric 108.

Figure 9:
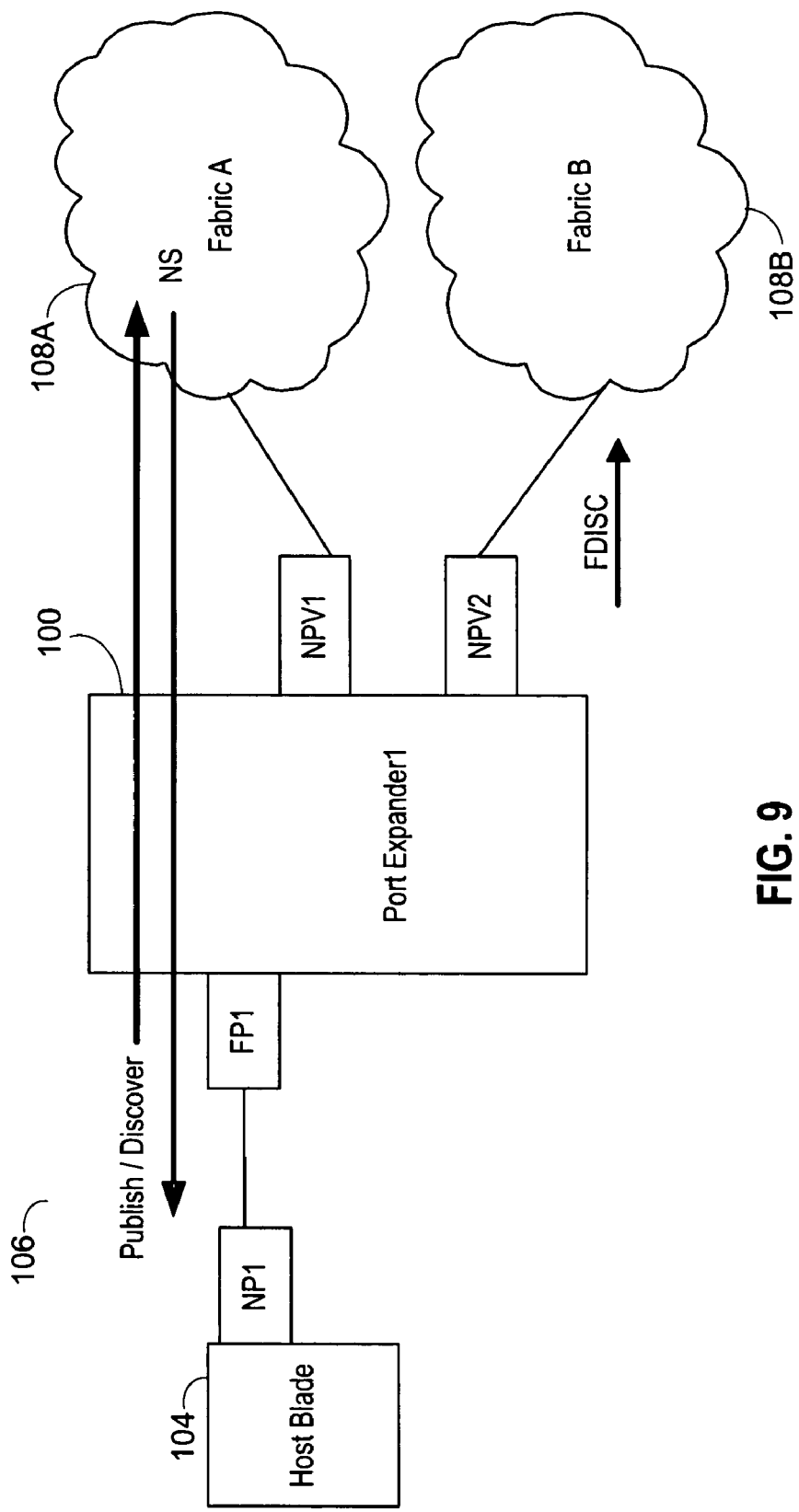
FIG. 9 depicts a device registration and discovery procedure according to the present invention.

Following the login and initialization process described above, the enterprise fabric's 108 name server may retrieve new and deleted NPV device information from the port expander 100. This process is performed directly with the appropriate host blade 104 as the port expander 100 is then transparent to these operations. Such registration and discovery is illustrated schematically in FIG. 9.

Figure 10:
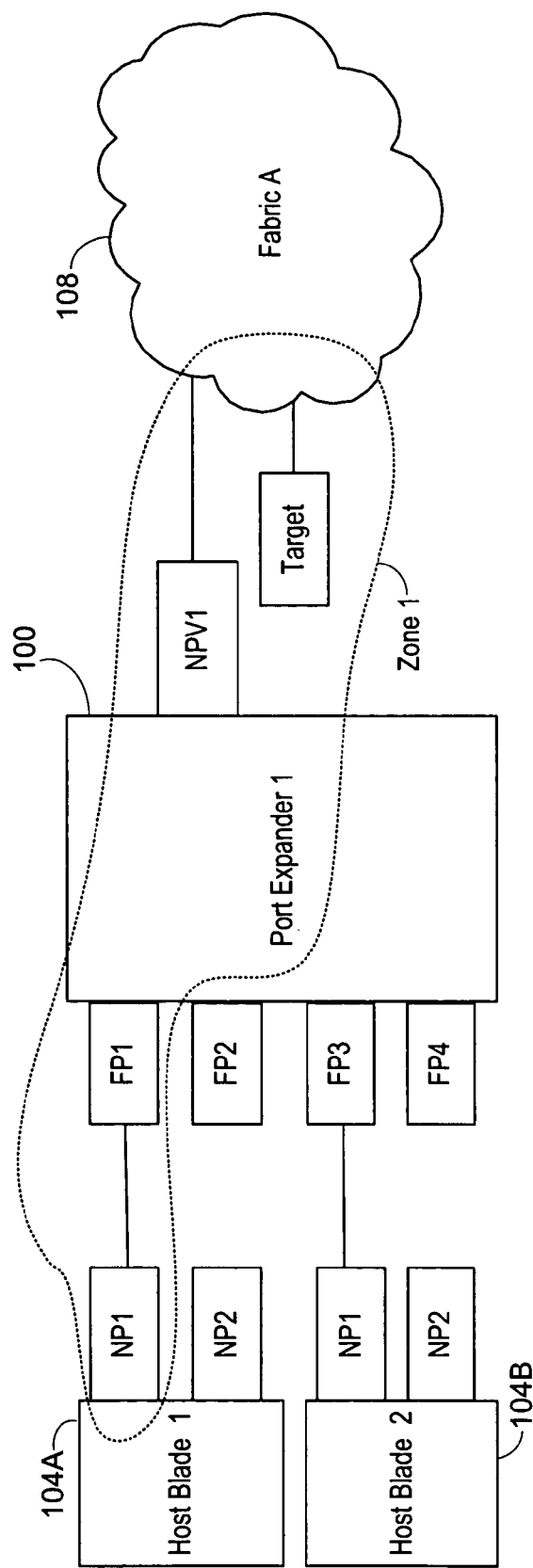
FIG. 10 depicts zoning in an enterprise fabric according to the present invention.

The port expander 100 does not impact Worldwide Named (WWN) based zoning. For domain, port based zoning, virtual N_port IDs will operate correctly as they map directly to host blades 104. To add a host blade 104 N_port to a zone, the host blade 104 is used as the PID for this port to be zoned. Such zoning is illustrated in FIG. 10 wherein host blades 104A and 104B connect to Fabric A 108 via the port expander 100.

In order to provide fault tolerance and better link utilization that can reduce the possibility of congestion, port expander 100 configurations may be able to support multiple paths from a host blade 104 to a target in the enterprise fabric 108. Depending on the capabilities of the host blade 104, it is possible to perform load balancing and/or fail over.

Figure 11:
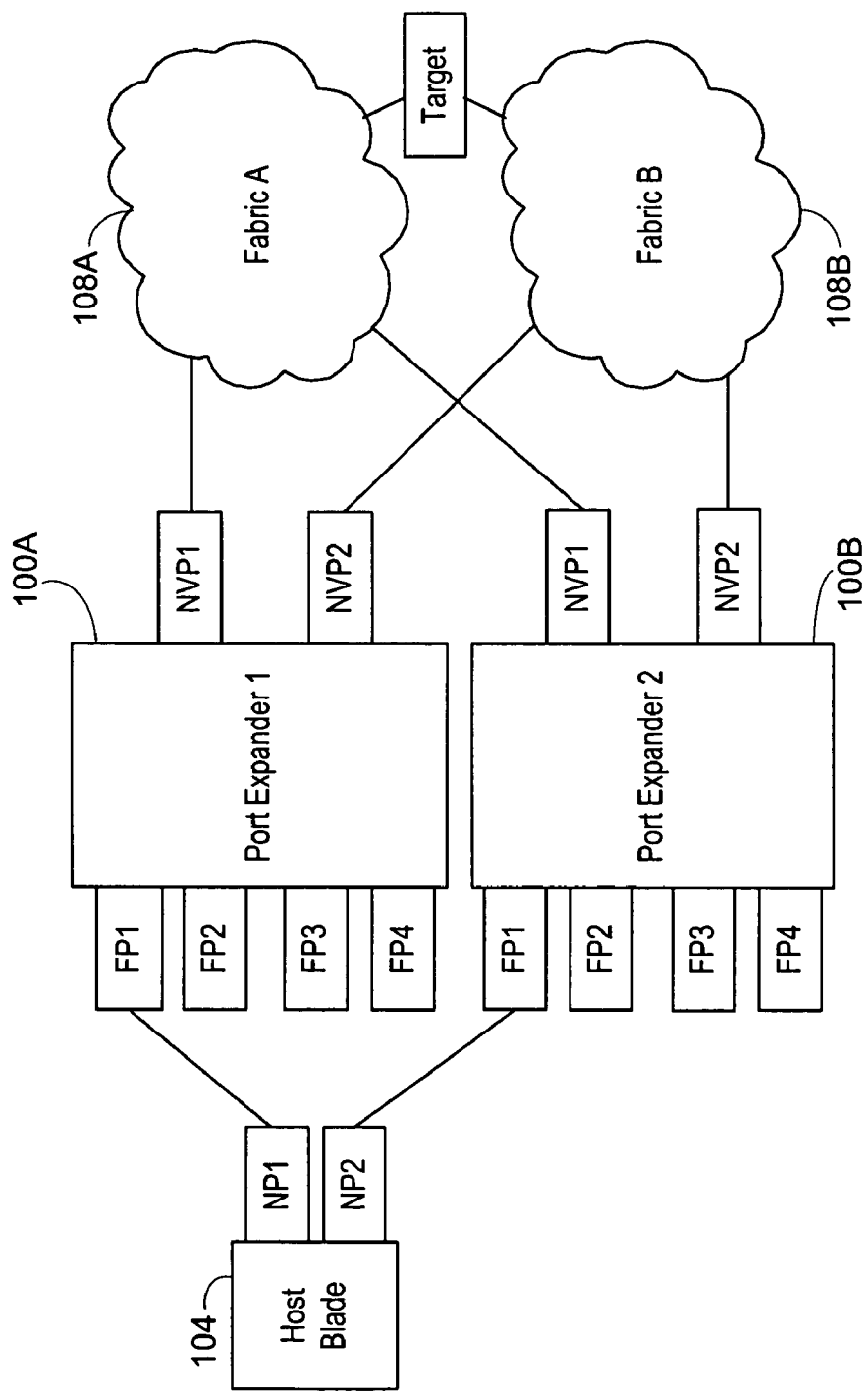
FIG. 11 shows load balancing and fail over with two port expanders according to the present invention.

FIG. 11 shows a dual port expander 100 configuration. This configuration allows a host blade 104 to be connected to two fabrics A and B 108A and 108B, over separate port expanders 100A and 100B. If the multipathing firmware in the host blade 104 supports load balancing, it is possible for the host blade 104 to send frames to Fabric A 108A or Fabric B 108B on both N_port 1 and N_port 2.

If the multipathing software is capable of supporting failover, the host blade 104 can send frames from N_port 2 if the path from N_port 1 to the target is not available for any reason, such as link going down or port expander 104A failing. The port expanders 100A, 100B support fail over in that if port expander 100A fails, it results in port expander 100B taking over and the enterprise fabrics 108 are not subjected to disruption.

In order to support in-band fabric management, for queries via CT pass thru from the host bus adapter, management CT frames may be allowed through the port expander 100 into enterprise fabrics 108. In order to support dynamic queries to the host bus adapter using FDMI-2, CT frames from enterprise fabric 108 switches may be allowed through the host bus adapter to the host blades 104.

From an in-band element management perspective, the port expander 100 is essentially transparent. This complicates management of the port expander 100 using in-band techniques. Out-of-band techniques, such as using the Ethernet port will operate normally, but proprietary, non-standard operations are required In the NPV implementation described in above references, the SID/DID validation in the miniswitch is turned off since NPV in some cases requires a PID to be assigned by the enterprise fabric 108. Hence the DID field in the transmitted frames and the SID fields in the received frames that are expected to match at the enterprise fabric's F_port, do not match in the case of NPV. This opens up security threats since the main purpose of the SID/DID checking is to prevent spoofing of authorized devices by unauthorized devices by using the PID of the authorized device. However, since the port expander 100 is acting as an intermediary in this case, it can prevent rogue devices from spoofing since the SID/DID checking happens at the F_port of the port expander 100. Further, the security threats can be mitigated using zones of trust.

Figure 12:
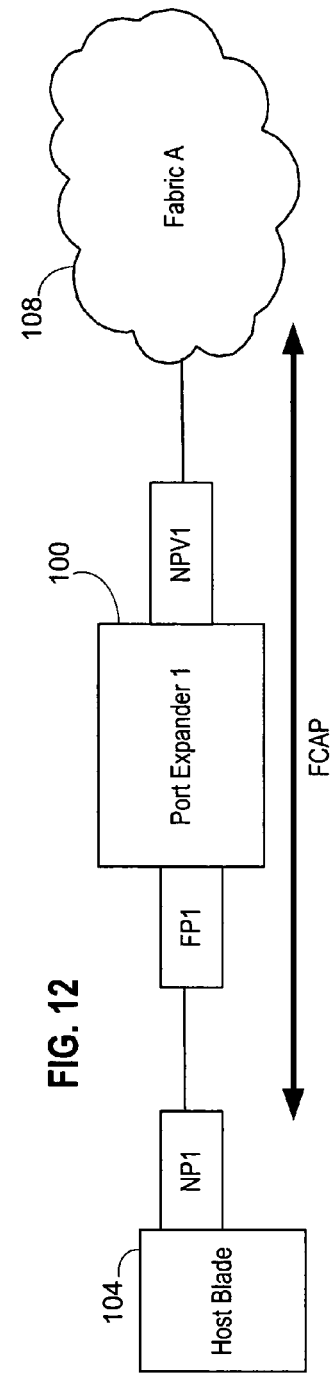
FIG. 12 shows the use of a Fibre Channel authentication protocol according to the present invention.

The FCAP protocol, as explained in U.S. patent application Ser. No. 10/062,125 filed Jan. 31, 2002 entitled "Network Security and Applications to the Fabric Environment" which is hereby incorporated by reference, is used by Secure FabOS to establish zones of trust. Host blades 104 operate directly with the enterprise fabric's 108 and may be a part of that zone of trust. FIG. 12 is a schematic representation showing FCAP between host blade 104 and the port expander 100 and between the port expander 100 and Fabric A 108.

Secure FabOS also has the notion of security policies that limit access to the fabric. One set of policies, the Device Connection Control (DCC) policies, may be used to determine which host blades 104 are allowed to connect to F_ports within the enterprise fabric 108. DCC policies may be exported from the enterprise fabrics 108 to the port expander 100 and enforced at the port expander 100.

Due to the unique placement of the port expander 100 at the edge of the enterprise fabric 108, it can further bolster the capabilities of Secure FabOS. Rules can be defined and enforced at the port expander 100 such that certain frames are filtered out and not allowed access into the enterprise fabric 108. These rules might take the form of access control policies or the form of policies that detect patterns in an attempt to differentiate legitimate traffic from intrusions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A data switching device for connecting to a series of nodes and to a first fabric, the device comprising:

a plurality of fabric ports for connecting to the series of nodes;

at least one node port for connecting to the first fabric; and a switch coupled to said plurality of fabric ports and said at least one node port for interconnecting said ports;

wherein said at least one node port operates as a virtual node port, with a different virtual node address representative of each of said plurality of fabric ports connected to nodes, and wherein said virtual node address representative of a fabric port and the address of a node connected to the representative of said plurality of fabric ports are the same.

2. The device of claim 1, wherein said switch is further adapted to act as a firewall.

3. The device of claim 1, wherein said switch is further adapted for intrusion detection.

4. The device of claim 1, wherein addresses include at least two different portions and wherein routing is performed using a first of said different portions from said at least one node port to said plurality of fabric ports and using a second of said different portions from said plurality of fabric ports to said at least one node port.

5. A Fibre channel switch for connecting to a series of nodes and to a first fabric, the switch comprising:

a plurality of F_ports for connecting to the series of nodes;

at least one N_port for connecting to the first fabric; and a switch circuit coupled to said plurality of F_ports and said at least one N_port for interconnecting said ports;

wherein said at least one N_port operates as a virtual node port, with a different virtual node address representative of each of said plurality of F_ports connected to nodes, and wherein said virtual node address representative of an F_port and the address of a node connected to the representative of said plurality of F_ports are the same.

6. The switch of claim 5, wherein said switch circuit is further adapted to act as a firewall.

7. The switch of claim 5, wherein said switch circuit is further adapted for intrusion detection.

8. The switch of claim 5, wherein addresses include domain, area and AL_PA portions and wherein routing is performed using the AL_PA portion from said at least one N_port to said plurality of F_ports and using the area portion from said plurality of F_ports to said at least one N_port.

9. A network comprising:
a series of nodes;
a first fabric; and
a data switching device connected to said series of nodes and to said first fabric, said device including:
a plurality of fabric ports for connecting to said series of nodes and forming a second fabric;
at least one node port for connecting to said first fabric; and
a switch coupled to said plurality of fabric ports and said at least one node port for interconnecting said ports.
wherein said at least one node port operates as a virtual node port, with a different virtual node address representative of each of said plurality of fabric ports connected to nodes, and
wherein said virtual node address representative of a fabric port and the address of a node connected to the representative of said plurality of fabric ports are the same.

10. The network of claim 9, wherein said switch is further adapted to act as a firewall.

11. The network of claim 9, wherein said switch is further adapted for intrusion detection.

12. The network of claim 9, wherein addresses include at least two different portions and wherein routing is performed using a first of said different portions from said at least one node port to said plurality of fabric ports and using a second of said different portions from said plurality of fabric ports to said at least one node port.

13. The network of claim 9, wherein said nodes are host computers.

14. The network of claim 13, wherein said host computers are blade computers and are located in a blade server chassis.

15. The network of claim 14, wherein said data switching device is a blade located in said blade server chassis.

16. A network comprising:
a series of nodes;
a first fabric; and
a Fibre channel switch connected to said series of nodes and to said first fabric, said switch including:
a plurality of F_ports for connecting to said series of nodes and forming a second fabric;
at least one N_port for connecting to said first fabric; and
a switch circuit coupled to said plurality of F_ports and said at least one N_port for interconnecting said ports.
wherein said at least one N_port operates as a virtual node port, with a different virtual node address representative of each of said plurality of F_ports connected to nodes, and
wherein said virtual node address representative of an F_port and the address of a node connected to the representative of said plurality of F_ports are the same.

17. The network of claim 16, wherein said switch circuit is further adapted to act as a firewall.

18. The network of claim 16, wherein said switch circuit is further adapted for intrusion detection.

19. The network of claim 16, wherein addresses include domain, area and AL_PA portions and wherein routing is performed using the AL_PA portion from said at least one N_port to said plurality of F_ports and using the area portion from said plurality of F_ports to said at least one N_port.

20. The network of claim 16, wherein said nodes are host computers.

21. The network of claim 20, wherein said host computers are blade computers and are located in a blade server chassis.

22. The network of claim 21, wherein said data switching device is a blade located in said blade server chassis.

23. A network comprising:
a series of nodes, each having two ports;
a first fabric; and
two data switching devices, each connected to one port of each of said series of nodes and to said first fabric, each said device including:
a plurality of fabric ports for connecting to said one port of said series of nodes and forming an additional fabric;
at least one node port for connecting to said first fabric; and
a switch coupled to said plurality of fabric ports and said at least one node port for interconnecting said ports.
wherein said at least one node port operates as a virtual node port, with a different virtual node address representative of each of said plurality of fabric ports connected to nodes, and
wherein said virtual node address representative of a fabric port and the address of a node connected to the representative of said plurality of fabric ports are the same.

24. The network of claim 23, wherein said switch is further adapted to act as a firewall.

25. The network of claim 23, wherein said switch is further adapted for intrusion detection.

26. The network of claim 23, wherein addresses include at least two different portions and wherein routing is performed using a first of said different portions from said at least one node port to said plurality of fabric ports and using a second of said different portions from said plurality of fabric ports to said at least one node port.

27. The network of claim 23, wherein said nodes are host computers.

28. The network of claim 27, wherein said host computers are blade computers and are located in a blade server chassis.

29. The network of claim 28, wherein each said data switching device is a blade located in said blade server chassis.

30. A network comprising:
a series of nodes, each having two ports;
a first fabric; and
two Fibre channel switches connected to one port of each of said series of nodes and to said first fabric, each said switch including:
a plurality of F_ports for connecting to said one port of said series of nodes and forming an additional fabric;
at least one N_port for connecting to said first fabric; and
a switch circuit coupled to said plurality of F_ports and said at least one N_port for interconnecting said ports.
wherein said at least one N_port operates as a virtual node port, with a different virtual node address representative of each of said plurality of F_ports connected to nodes, and
wherein said virtual node address representative of an F_port and the address of a node connected to the representative of said plurality of F_ports are the same.

31. The network of claim 30, wherein said switch circuit is further adapted to act as a firewall.

32. The network of claim 30, wherein said switch circuit is further adapted for intrusion detection.

33. The network of claim 30, wherein addresses include domain, area and AL_PA portions and wherein routing is performed using the AL_PA portion from said at least one N_port to said plurality of F_ports and using the area portion from said plurality of F_ports to said at least one N_port.

34. The network of claim 30, wherein said nodes are host computers.

35. The network of claim 34, wherein said host computers are blade computers and are located in a blade server chassis.

36. The network of claim 35, wherein said data switching device is a blade located in said blade server chassis.

37. A network comprising:
a series of nodes, each having two ports;
first and second fabrics; and
two data switching devices, each connected to one port of each of said series of nodes and to said first and second fabrics, each said device including:
a plurality of fabric ports for connecting to said one port of said series of nodes and forming an additional fabric;
two node ports, one for connecting to each of said first and second fabrics; and
a switch coupled to said plurality of fabric ports and said two node ports for interconnecting said ports.
wherein said node ports operate as virtual node ports, with a different virtual node address representative of each of said plurality of fabric ports connected to nodes, and
wherein said virtual node address representative of a fabric port and the address of a node connected to the representative of said plurality of fabric ports are the same.

38. The network of claim 37, wherein said switch is further adapted to act as a firewall.

39. The network of claim 37, wherein said switch is further adapted for intrusion detection.

40. The network of claim 37, wherein addresses include at least two different portions and wherein routing is performed using a first of said different portions from said node ports to said plurality of fabric ports and using a second of said different portions from said plurality of fabric ports to said node ports.

41. The network of claim 37, wherein said nodes are host computers.

42. The network of claim 41, wherein said host computers are blade computers and are located in a blade server chassis.

43. The network of claim 42, wherein each said data switching device is a blade located in said blade server chassis.

44. A network comprising:
a series of nodes, each having two ports;
first and second fabrics; and
two Fibre channel switches connected to one port of each of said series of nodes and to said first and second fabrics, each said switch including:
a plurality of F_ports for connecting to said one port of said series of nodes and forming an additional fabric;
two N_ports, one for connecting to each of said first and second fabrics; and
a switch circuit coupled to said plurality of F_ports and said two N_ports for interconnecting said ports.
wherein said N_ports operate as virtual node ports, with a different virtual node address representative of each of said plurality of F_ports connected to nodes, and
wherein said virtual node address representative of an F_port and the address of a node connected to the representative of said plurality of F_ports are the same.

45. The network of claim 44, wherein said switch circuit is further adapted to act as a firewall.

46. The network of claim 44, wherein said switch circuit is further adapted for intrusion detection.

47. The network of claim 44, wherein addresses include domain, area and AL_PA portions and wherein routing is performed using the AL_PA portion from said N_ports to said plurality of F_ports and using the area portion from said plurality of F_ports to said N_ports.

48. The network of claim 44, wherein said nodes are host computers.

49. The network of claim 48, wherein said host computers are blade computers and are located in a blade server chassis.

50. The network of claim 49, wherein said data switching device is a blade located in said blade server chassis.

51. A network comprising:
a series of nodes, each having two ports;
first and second fabrics; and
two data switching devices, each connected to one port of each of said series of nodes and to one of said first and second fabrics, each said device including:
a plurality of fabric ports for connecting to said one port of said series of nodes and forming an additional fabric;
two node ports for connecting to one of said first and second fabrics; and
switch coupled to said plurality of fabric ports and said two node ports for interconnecting said ports.
wherein said node ports operate as virtual node ports, with a different virtual node address representative of each of said plurality of fabric ports connected to nodes, and
wherein said virtual node address representative of a fabric port and the address of a node connected to the representative of said plurality of fabric ports are the same.

52. The network of claim 51, wherein said switch is further adapted to act as a firewall.

53. The network of claim 51, wherein said switch is further adapted for intrusion detection.

54. The network of claim 51, wherein addresses include at least two different portions and wherein routing is performed using a first of said different portions from said node ports to said plurality of fabric ports and using a second of said different portions from said plurality of fabric ports to said node ports.

55. The network of claim 51, wherein said nodes are host computers.

56. The network of claim 55, wherein said host computers are blade computers and are located in a blade server chassis.

57. The network of claim 56, wherein each said data switching device is a blade located in said blade server chassis.

58. A network comprising:
a series of nodes, each having two ports;
first and second fabrics; and
two Fibre channel switches connected to one port of each of said series of nodes and to one of said first and second fabrics, each said switch including:
a plurality of F_ports for connecting to said one port of said series of nodes and forming an additional fabric;
two N_ports for connecting to one of said first and second fabrics; and
a switch circuit coupled to said plurality of F_ports and said two N_ports for interconnecting said ports.

wherein said N_ports operate as virtual node ports, with a different virtual node address representative of each of said plurality of F_ports connected to nodes, and wherein said virtual node address representative of an F_port and the address of a node connected to the representative of said plurality of F_ports are the same.

59. The network of claim 58, wherein said switch circuit is further adapted to act as a firewall.

60. The network of claim 58, wherein said switch circuit is further adapted for intrusion detection.

61. The network of claim 58, wherein addresses include domain, area and AL_PA portions and wherein routing is performed using the AL_PA portion from said N_ports to said plurality of F_ports and using the area portion from said plurality of F_ports to said N_ports.

62. The network of claim 58, wherein said nodes are host computers.

63. The network of claim 62, wherein said host computers are blade computers and are located in a blade server chassis.

64. The network of claim 63, wherein said data switching device is a blade located in said blade server chassis.

65. A method for routing between a series of nodes and a first fabric using a data switching device, the method comprising:

providing a plurality of fabric ports on the device for connecting to the series of nodes and forming a second fabric;

providing at least one node port on the device for connecting to the first fabric;

interconnecting said plurality of fabric ports and said at least one node port with the device; and operating said at least one node port as a virtual node port, with one virtual node address for each of said plurality of fabric ports connected to nodes, with a different virtual node address representative of each of said plurality of fabric ports connected to nodes, wherein said virtual node address representative of a fabric port and the address of a node connected to the representative of said plurality of fabric ports are the same.

66. The method of claim 65, wherein addresses include at least two different portions, the method further comprising:

routing performed using a first of said different portions from said at least one node port to said plurality of fabric ports and using a second of said different portions from said plurality of fabric ports to said at least one node port.

* * * * *

UNITED STATES PATENT AND TRADEMARK OFFICE
CERTIFICATE OF CORRECTION

PATENT NO. : 7,577,134 B2  Page 1 of 1
APPLICATION NO. : 11/208412
DATED : August 18, 2009
INVENTOR(S) : Gowda et al.

It is certified that error appears in the above-identified patent and that said Letters Patent is hereby corrected as shown below:

At column 11, line 23:
   Please replace "said ports." with --said ports;--
At column 11, line 56:
   Please replace "said ports." with --said ports;--
At column 12, line 24:
   Please replace "said ports." with --said ports;--
At column 12, line 60:
   Please replace "said ports." with --said ports;--
At column 13, line 28:
   Please replace "said ports." with --said ports;--
At column 13, line 64:
   Please replace "said ports." with --said ports;--
At column 14, line 30:
   Please replace "switch coupled to" with --a switched coupled to--
At column 14, line 31:
   Please replace "said ports." with --said ports;--
At column 14, line 67:
   Please replace "said ports." with --said ports;--

Signed and Sealed this

Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,577,134 B2  Page 1 of 1
APPLICATION NO. : 11/208412
DATED : August 18, 2009
INVENTOR(S) : Gopal Gowda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this

Seventh Day of September, 2010

David J. Kappos
*Director of the United States Patent and Trademark Office*